(12) United States Patent
Kang et al.

(10) Patent No.: US 9,310,496 B2
(45) Date of Patent: Apr. 12, 2016

(54) CALIBRATION APPARATUS AND METHOD

(71) Applicant: SAMSUNG ELECTRONICS CO., LTD., Suwon-si (KR)

(72) Inventors: Sung Hoon Kang, Suwon-si (KR); Dong Goo Kang, Suwon-si (KR); Sung Su Kim, Yongin-si (KR); Young Hun Sung, Hwaseong-si (KR); Hyun Hwa Oh, Hwaseong-si (KR)

(73) Assignee: SAMSUNG ELECTRONICS CO., LTD., Suwon-si (KR)

( * ) Notice: Subject to any disclaimer, the term of this patent is extended or adjusted under 35 U.S.C. 154(b) by 311 days.

(21) Appl. No.: 13/871,576

(22) Filed: Apr. 26, 2013

(65) Prior Publication Data

US 2014/0105369 A1    Apr. 17, 2014

(30) Foreign Application Priority Data

Oct. 16, 2012  (KR) .................. 10-2012-0114875

(51) Int. Cl.
*G01T 7/00*     (2006.01)
(52) U.S. Cl.
CPC ...................................... *G01T 7/005* (2013.01)
(58) Field of Classification Search
CPC .... A61B 6/032; A61B 6/4035; A61B 6/4042; A61B 6/4441; A61B 6/482; A61B 6/585; A61B 6/583; A61B 6/037; A61B 6/405; A61B 6/4233; A61B 6/505; A61B 6/5235; A61B 6/502; A61B 6/507; A61B 6/5217; A61B 6/025; A61B 6/0421; A61B 6/4488; A61B 6/463; A61B 8/0875; A61B 8/05; G01N 2223/3037; G01N 15/042; G01N 15/05; G01N 2015/047; G01N 2035/00495; G01N 21/51; G01N 2223/076; G01N 2223/637; G01N 23/223; G01T 1/1647; G01T 7/005; A61M 1/3693; A61M 2202/0439; A61M 2202/0071; A61M 1/3696; A61M 2205/3306; B04B 13/00; B04B 2013/006
USPC ...................................... 378/62, 207
See application file for complete search history.

(56) References Cited

U.S. PATENT DOCUMENTS 6,104,777 A * 8/2000 Darboux et al. ............ 378/62
7,606,347 B2  10/2009 Tkaczyk et al.
(Continued)

FOREIGN PATENT DOCUMENTS

JP    2007-147472 A    6/2007
JP    2010-249534 A    11/2010
KR    10-2008-0113012 A    12/2008
(Continued)

OTHER PUBLICATIONS

Barber, William C. et al. "Characterization of a novel photon counting detector for clinical CT: count rate, energy resolution, and noise performance." Medical Imaging 2009: Physics of Medical Imaging. Proc. of SPIE vol. 7258, 725824, pp. 1-9.

*Primary Examiner* — Irakli Kiknadze
(74) *Attorney, Agent, or Firm* — Sughrue Mion, PLLC

(57) ABSTRACT

Provided are a calibration apparatus and method that may be used for setting a magnitude of an electric pulse based on a result obtained by imaging at least one imaging object, and that may be used for calibrating by mapping at least one photon energy corresponding to an absorption edge of at least one calibration object.

24 Claims, 5 Drawing Sheets

(56) References Cited

U.S. PATENT DOCUMENTS

2008/0095313 A1* 4/2008 Ruhrnschopf et al. ....... 378/98.4
2011/0012014 A1   1/2011 Livne et al.

FOREIGN PATENT DOCUMENTS

| KR | 10-2011-0055870 A | 5/2011 |
| KR | 10-2011-0059988 A | 6/2011 |

* cited by examiner

CALIBRATION APPARATUS AND METHOD

CROSS-REFERENCE TO RELATED APPLICATION

This application claims priority from Korean Patent Application No. 10-2012-0114875, filed on Oct. 16, 2012, in the Korean Intellectual Property Office, the disclosure of which is incorporated herein by reference in its entirety.

BACKGROUND

1. Field

Methods and apparatuses consistent with exemplary embodiments relate to a calibration method which is executable by using a photon counting X-ray detector.

2. Description of the Related Art

A photon counting X-ray detector may separate X-rays which are applied to the photon counting X-ray detector, for each photon energy band.

Because a conventional integration type detector adds all electrical signals generated by an X-ray photon which are applied to the conventional integration type detector, regardless of photon energy, it may be difficult to separate photon energy.

In a conventional method used for energy calibration of a photon counting detector, a spectrum of an X-ray which is measured by using a photon counting X-ray detector is used.

In the conventional method, an X-ray spectrum may be obtained by obtaining an image while changing a threshold energy value at equal intervals and by calculating a signal difference caused by a change in threshold energy.

In an example, an energy calibration scheme using a spectrum of an X-ray may be performed by setting an X-ray tube at a predetermined acceleration voltage peak kilovoltage (kVp), by measuring an X-ray spectrum using a photon counting X-ray detector while irradiating an X-ray, and by mapping a location in which the spectrum has a value of "0" to the predetermined acceleration voltage.

However, in this example, because it is difficult to accurately measure the location, the accuracy of the mapping may be reduced.

In another example, an energy calibration scheme may be performed by imaging a material having an absorption edge in a used X-ray energy area, and by mapping a location of an absorption edge measured in an acquired spectrum to energy of an absorption edge of an actual material.

However, in this example, the uniformity of a value which is measured by using a photon counting X-ray detector may be reduced due to a limitation on a location measurement accuracy of an absorption edge.

In still another example, an energy calibration scheme may be performed by obtaining a spectrum while measuring an X-ray which is generated in a radioactive isotope, and by mapping a predetermined energy of an isotope to a peak of the spectrum.

However, in this example, the energy calibration scheme requires an additional instrument which is used to manage a high radioactive isotope.

SUMMARY

According to one or more exemplary embodiments, there may be provided a calibration apparatus which includes an image generator which generates an image of at least one imaging object, a setter which sets a threshold which relates to a magnitude of an electric pulse based on a result obtained by generating the image of the at least one imaging object, and a calibrator which calibrates by mapping at least one photon energy which corresponds to an absorption edge of at least one calibration object.

The at least one imaging object may include homogeneous materials, and a geometry of the at least one imaging object may be set.

The at least one calibration object may include a material which includes the absorption edge for which the at least one corresponding photon energy falls within a range of a measurable x-ray photon energy.

A ratio of a first quantity relating to an imaging result which relates to a case in which the at least one imaging object does not exist to a second quantity relating to an imaging result which relates to a case in which when the at least one imaging object exists may reflect a characteristic of the at least one imaging object.

A normalized intensity of an image representing the at least one imaging object may reflect information relating to a geometry of the at least one imaging object.

The setter may set a threshold which relates to a magnitude of an electric pulse which is generated in at least one pixel by an x-ray photon.

The setter may change a normalized intensity value of a pixel among the at least one pixel, and may match the changed normalized intensity value to a normalized intensity value of another pixel.

The setter may set the at least one pixel to have a same normalized intensity with respect to a threshold energy value that is set in advance.

The calibrator may calculate a ratio of a first quantity relating to an x-ray spectrum which is measured when the at least one imaging object does not exist to a second quantity relating to an x-ray spectrum which measured when the at least one imaging object exists, and may extract a location in which an x-ray is significantly attenuated.

The absorption edge of the at least one calibration object may include an absorption edge of a material which is used for forming the at least one calibration object in the extracted location in which the x-ray is significantly attenuated.

According to one or more exemplary embodiments, there may be provided a calibration method, the method including: generating an image of at least one imaging object, setting a threshold which relates to a magnitude of an electric pulse based on a result obtained by generating the image of the at least one imaging object, and calibrating by mapping at least one photon energy which corresponds to an absorption edge of at least one calibration object.

BRIEF DESCRIPTION OF THE DRAWINGS

The above and other aspects of exemplary embodiments will become apparent and more readily appreciated from the following detailed description of certain exemplary embodiments, taken in conjunction with the accompanying drawings of which.

DETAILED DESCRIPTION

Figure 1:
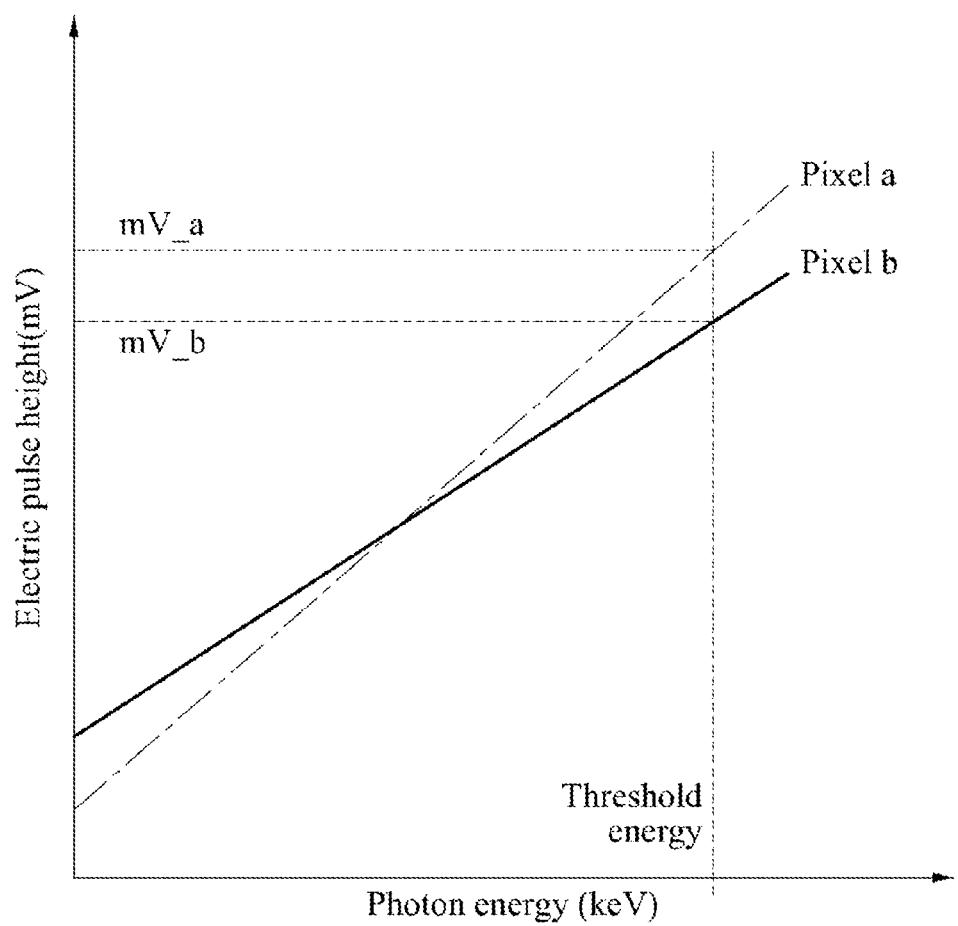
FIG. 1 is a graph which illustrates a relationship between an energy of an X-ray photon which is applied to a photon counting X-ray detector and a magnitude of an electric pulse which is generated by the energy, according to one or more exemplary embodiments.

Reference will now be made in detail to exemplary embodiments, examples of which are illustrated in the accompanying drawings, wherein like reference numerals refer to the like elements throughout. Exemplary embodiments are described below in order to explain the present disclosure by referring to the figures.

To facilitate understating of a calibration apparatus and method according to exemplary embodiments, a photon counting X-ray detector will be described.

The photon counting X-ray detector may detect X-rays which have photon energies above a predetermined photon energy, that is, a threshold energy. By using a spectral characteristic of an object to be tested by X-ray imaging, materials of the object may be distinguished from an image acquired by the photon counting X-ray detector.

Additionally, the photon counting X-ray detector may improve an accuracy of a diagnosis in a medical X-ray imaging field, and may increase a quality of an image in a nondestructive inspection field and a security inspection field.

The photon counting X-ray detector may measure a number of X-ray photons which have photon energies above a predetermined photon energy, that is, a threshold energy, from among X-ray photons which are applied to the photon counting X-ray detector.

When an X-ray photon enters a photon conductor of the photon counting X-ray detector, an electron-hole pair may be generated, which generated electron-hole pair may enable electric pulses to be generated.

Magnitudes of the electric pulses that are expressed in millivolts (mV) may have relevance to an energy of the X-ray photon that is expressed in kiloelectron volts (keV).

In order to measure the number of the X-ray photons which have the photon energies above the threshold energy, the photon counting X-ray detector may convert the threshold energy to a magnitude of an electric pulse in mV, and a circuit which includes the photon counting X-ray detector may measure a number of electric pulses which have greater magnitudes from among the generated electric pulses.

The photon counting X-ray detector may analyze a characteristic of the object, by separating X-ray photons which are applied to the photon counting X-ray detector for each energy band. Accordingly, it is important that all pixels of the photon counting X-ray detector have a same energy separation characteristic.

A magnitude of an electric pulse which is generated in at least one pixel of the photon counting X-ray detector may be affected by an energy of an X-ray photon, as well as by a circuit characteristic, a characteristic of a photon conductor that enables electric pulses to be generated in each pixel, and any other relevant characteristic.

Electric pulses which are generated for each pixel in association with X-ray photons which have the same energies may have different magnitudes, and pixels of the photon counting X-ray detector may have different photon energy separation characteristics.

FIG. 1 is a graph which illustrates a relationship between an energy of an X-ray photon which is applied to a photon counting X-ray detector and a magnitude of an electric pulse which is generated by the energy, according to one or more exemplary embodiments.

As shown in FIG. 1, a keV-mV curve of an electric pulse of a pixel a may be distinct from a keV-mV curve of an electric pulse of a pixel b. The pixels a and b may be detected by the photon counting X-ray detector.

The photon counting X-ray detector may perform energy calibration, in order to accurately measure a number of photons which have energies above a threshold energy desired by all pixels. The energy calibration may be performed to set a value of an electric pulse which corresponds to the threshold energy for each pixel.

For example, the pixels a and b may desirably be set prior to acquisition of an image, so that a number of electric pulses which have magnitudes equal to or greater than "mV_a" and a number of electric pulses which have magnitudes equal to or greater than "mV_b" may be measured.

In order to accurately perform calibration in all threshold energies, the photon counting X-ray detector may be required to measure electric pulse values of all photon energies. However, when an image is acquired, a fixed threshold energy value may be used.

Accordingly, when only an electric pulse value in a required photon energy is accurately set, despite the calibration not being accurately performed in all photon energies, an energy separation characteristic of the photon counting X-ray detector may be calibrated.

This is because the ability to accurately calibrate the energy separation characteristic of the photon counting X-ray detector may merely require a determination of whether the magnitude of the generated electric pulse exceeds a predetermined value.

The photon counting X-ray detector may obtain, for each pixel, a relationship between a photon energy which is applied to the photon counting X-ray detector and an electric pulse which is generated by the photon energy, and calibration may be required so that all pixels may have the same photon energy separation characteristic.

The photon counting X-ray detector may desirably perform energy calibration, so that all pixels may count photons which have photon energies above the same threshold photon energy.

Hereinafter, a calibration method which may be executed by using a calibration apparatus according to one or more exemplary embodiments will be described, and reference numerals of FIG. 2 may be cited in FIGS. 3, 4, and 5 for understanding of description.

Figure 2:
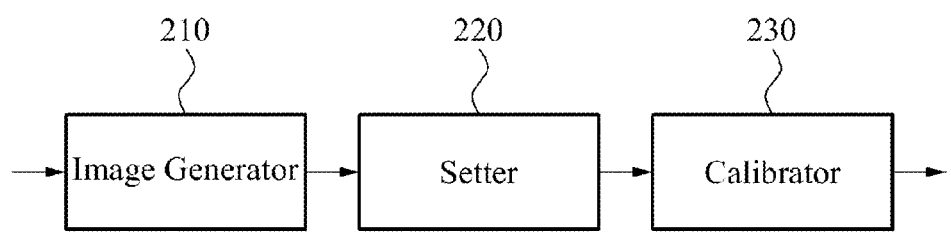
FIG. 2 is a block diagram which illustrates a configuration of a calibration apparatus, according to one or more exemplary embodiments.

FIG. 2 is a block diagram which illustrates a configuration of a calibration apparatus, according to one or more exemplary embodiments.

Referring to FIG. 2, the calibration apparatus may include an image generator 210, a setter 220, and a calibrator 230.

The image generator 210 may generate an image of at least one imaging object. The setter 220 may set a threshold which relates to a magnitude of an electric pulse based on a result obtained by generating the image of the at least one imaging object. The calibrator 230 may calibrate by mapping at least one photon energy which corresponds to an absorption edge of at least one calibration object.

Figure 3:
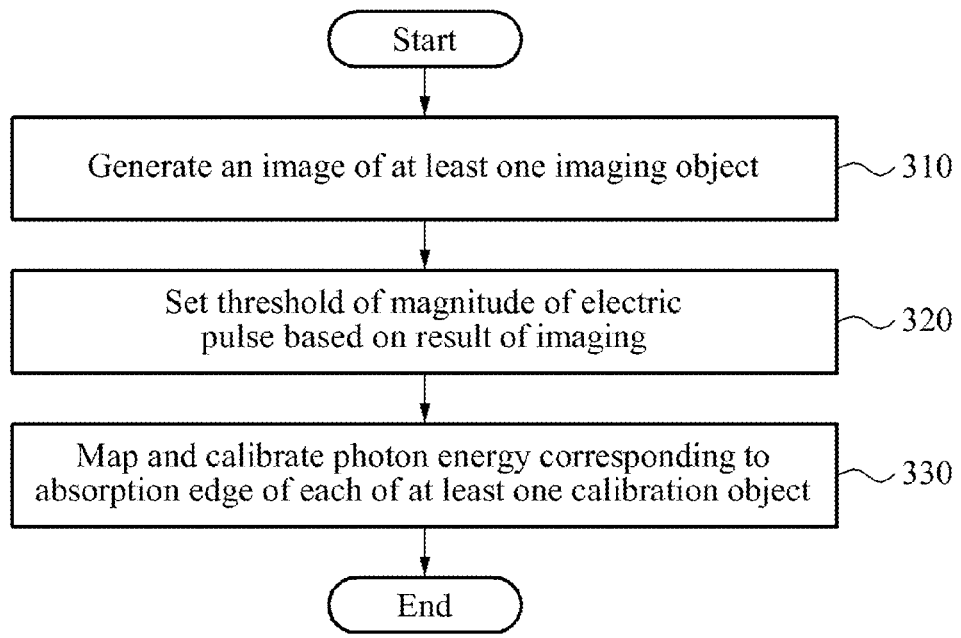
FIG. 3 is a flowchart which illustrates a calibration method, according to one or more exemplary embodiments.

FIG. 3 is a flowchart which illustrates a calibration method, according to one or more exemplary embodiments.

Referring to FIG. 3, in operation 310, a calibration apparatus may generate an image of at least one imaging object.

For example, the at least one imaging object may include homogeneous materials, and a geometry of the at least one imaging object may be set. At least one calibration object may include a material which includes an absorption edge for which the at least one corresponding photon energy falls within a range of a measurable X-ray photon energy.

Figure 4:
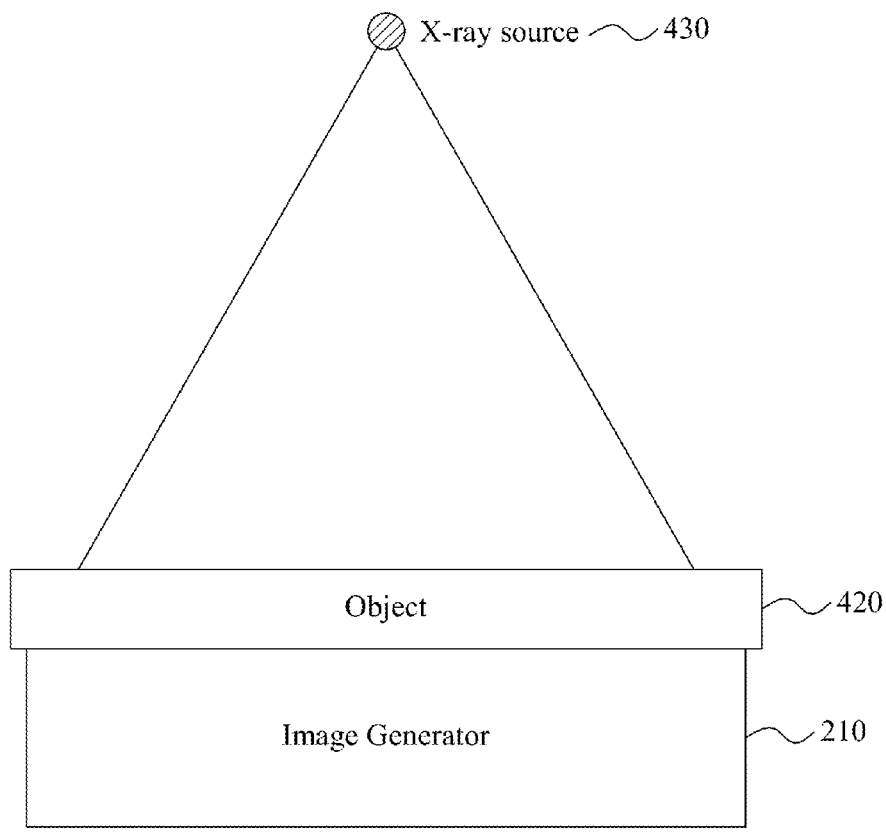
FIG. 4 is a diagram which illustrates an example of generating an image of an object by using an image generator.

FIG. 4 is a diagram which illustrates an example of generating an image of an object by using an image generator.

For example, the image generator 210 of FIG. 2 may generate an image of an object 420 by using a photon counting X-ray detector (not shown) in conjunction with an X-ray source 430. The object 420 may include homogeneous materials, and a geometry of the object 420 may be accurately known.

Additionally, the calibration apparatus may implement an energy calibration method which is executable by using a photon counting X-ray detector with respect to an object. A configuration, physical properties and a geometry of the object may be known.

A ratio of a first quantity relating to an imaging result "I0" relates to a case in which the at least one imaging object does not exist to a second quantity relating to an imaging result "I" which relates to a case in which the at least one imaging object exists, that is, a normalized intensity "I0/I," may reflect a characteristic of the at least one imaging object.

A normalized intensity of the at least one imaging object may reflect information relating to a geometry of the at least one imaging object.

Because all portions of a material have the same characteristics, a normalized intensity may accurately reflect only information relating to a geometry of an imaging object.

For example, when an object having homogeneous materials and a constant thickness is imaged by the calibration apparatus, normalized intensity values which are obtained by using the photon counting X-ray detector may be the same.

When an energy separation characteristic of the photon counting X-ray detector is not calibrated, despite an object having homogeneous materials and a constant thickness being imaged by the calibration apparatus, normalized intensity values which are obtained for each pixel may be different from each other.

Figure 5:
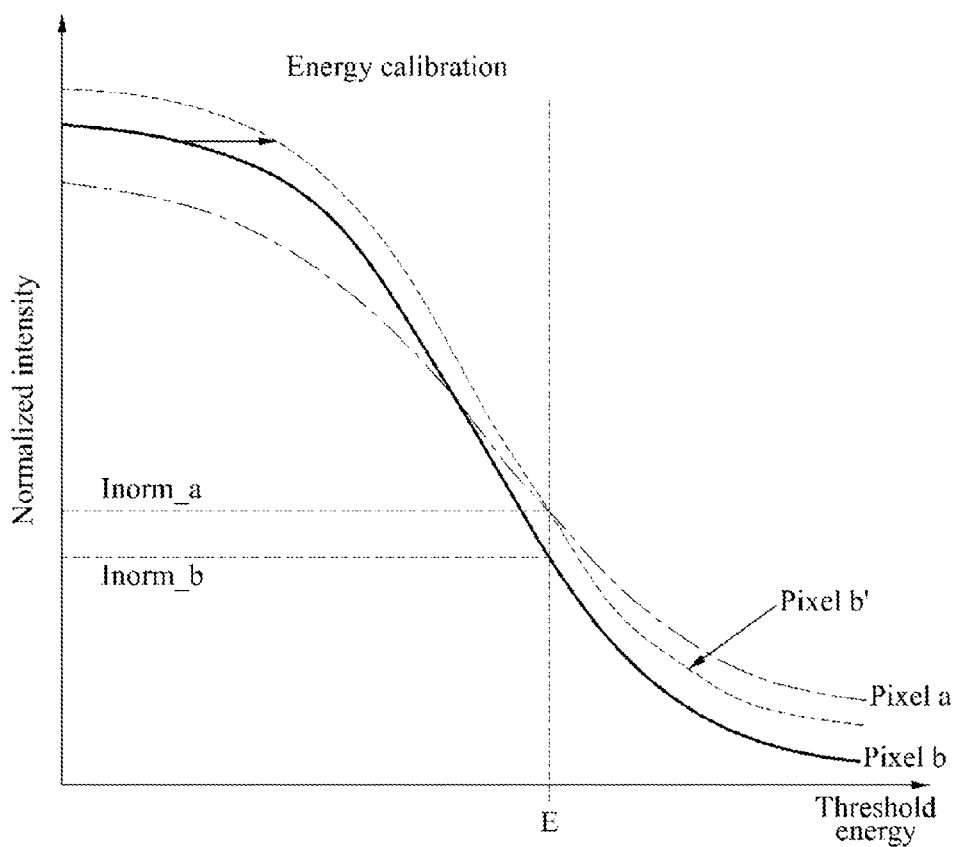
FIG. 5 is a graph which illustrates an example of a normalized intensity which is measured based on a change in a threshold energy of a calibration apparatus, according to one or more exemplary embodiments.

FIG. 5 is a graph which illustrates an example of a normalized intensity which is measured based on a change in a threshold energy of a calibration apparatus, according to one or more exemplary embodiments.

When energy calibration of a photon counting X-ray detector is accurately performed with respect to a threshold energy E by the calibration apparatus, pixels a and b may have the same normalized intensity values.

Referring to FIG. 5, different normalized intensity values may be obtained due to inaccurate energy calibration with respect to the threshold energy E. Additionally, the calibration apparatus may perform a process for setting a normalized intensity.

Referring back to FIG. 3, in operation 320, the calibration apparatus may set a threshold which relates to a magnitude of an electric pulse, based on a result of the imaging performed in operation 310.

The setter 220 of FIG. 2 may set a threshold which relates to a magnitude of an electric pulse which is generated in at least one pixel by an X-ray photon.

The setter 220 may change a normalized intensity value of a pixel from among the at least one pixel, and may match the changed normalized intensity value to a normalized intensity value of another pixel.

Additionally, the setter 220 may set the at least one pixel to have the same normalized intensity with respect to a threshold energy value that is set in advance.

For example, when a magnitude of an electric pulse which is generated in at least one pixel by an X-ray photon which has a photon energy E is accurately set, the calibration apparatus may shift a curve of the pixel b to the left or the right as shown in FIG. 5, in order to match a normalized intensity value of the pixel a to a normalized intensity value of the pixel b with respect to the photon energy E.

By executing the above process, the calibration apparatus may enable the same normalized intensity of all pixels of the photon counting X-ray detector to be measured with respect to a predetermined threshold energy, for example energy E.

In order to calibrate an accuracy of normalized intensity values, the calibration apparatus may perform a calibration operation.

Referring back to FIG. 3, in operation 330, the calibration apparatus may calibrate by mapping at least one photon energy which corresponds to an absorption edge of the at least one calibration object.

The calibrator 230 of FIG. 2 may calculate a ratio of a first quantity relating to an X-ray spectrum which is measured when the at least one imaging object does not exist to a second quantity relating to an X-ray spectrum which is measured when the at least one imaging object exists, and may extract a location in which an x-ray is significantly attenuated.

The absorption edge of the at least one calibration object comprises an absorption edge of a material which is used for forming the at least one calibration object in the extracted location in which the x-ray is significantly attenuated.

For example, when the calibration apparatus generates an image of an object which includes an absorption edge for which at least one corresponding photon energy falls within a range of a measured photon energy, and calculates a ratio of a first quantity relating to an X-ray spectrum which is measured when the object does not exist to a second quantity relating to an X-ray spectrum which is measured when the object exists, a location in which an X-ray is significantly attenuated may be determined.

In this example, the calibration apparatus may calibrate an accuracy of energy calibration, by mapping, to the determined location, at least one photon energy which corresponds to an absorption edge of a material which is used for forming the object.

The method according to the above-described exemplary embodiments may be recorded in transitory or non-transitory computer-readable media which include program instructions which implement various operations embodied by a computer. The media may also include, alone or in combination with the program instructions, data files, data structures, and the like. Examples of non-transitory computer-readable media include magnetic media such as hard disks, floppy disks, and magnetic tape; optical media such as compact disk—read-only memory (CD ROM) disks and digital versatile disks (DVDs); magneto-optical media such as optical disks; and hardware devices that are specially configured to store and perform program instructions, such as read-only memory (ROM), random access memory (RAM), flash memory, and the like. Examples of program instructions include both machine code, such as produced by a compiler, and files containing higher level code that may be executed by the computer using an interpreter. The described hardware devices may be configured to act as one or more software modules in order to perform the operations of the above-described exemplary embodiments, or vice versa.

Although a few exemplary embodiments have been shown and described, the present inventive concept is not limited thereto. Instead, it will be appreciated by those skilled in the art that changes may be made to these exemplary embodi-

What is claimed is:

1. A calibration apparatus, comprising:
an image generator which generates an image of at least one imaging object;
a setter which sets a threshold which relates to a magnitude of an electric pulse based on a result obtained by generating the image of the at least one imaging object; and
a calibrator which calibrates by mapping at least one photon energy which corresponds to an absorption edge of at least one calibration object.

2. The calibration apparatus of claim 1, wherein the at least one imaging object comprises homogeneous materials, and a geometry of the at least one imaging object is set.

3. The calibration apparatus of claim 1, wherein the at least one calibration object comprises a material which includes the absorption edge for which the at least one corresponding photon energy falls within a range of a measurable x-ray photon energy.

4. The calibration apparatus of claim 1, wherein a ratio of a first quantity relating to an imaging result which relates to a case in which the at least one imaging object does not exist to a second quantity relating to an imaging result which relates to a case in which the at least one imaging object exists reflects a characteristic of the at least one imaging object.

5. The calibration apparatus of claim 1, wherein a normalized intensity of an image representing the at least one imaging object reflects information relating to a geometry of the at least one imaging object.

6. The calibration apparatus of claim 1, wherein the setter sets a threshold which relates to a magnitude of an electric pulse which is generated in at least one pixel by an x-ray photon.

7. The calibration apparatus of claim 6, wherein the setter changes a normalized intensity value of a pixel among the at least one pixel, and matches the changed normalized intensity value to a normalized intensity value of another pixel.

8. The calibration apparatus of claim 6, wherein the setter sets the at least one pixel to have a same normalized intensity with respect to a threshold energy value that is set in advance.

9. The calibration apparatus of claim 1, wherein the calibrator calculates a ratio of a first quantity relating to an x-ray spectrum which is measured when the at least one imaging object does not exist to a second quantity relating to an x-ray spectrum which is measured when the at least one imaging object exists, and extracts a location in which an x-ray is significantly attenuated.

10. The calibration apparatus of claim 9, wherein the absorption edge of the at least one calibration object comprises an absorption edge of a material which is used for forming the at least one calibration object in the extracted location in which the x-ray is significantly attenuated.

11. A calibration method, comprising:
generating an image of at least one imaging object;
setting a threshold which relates to a magnitude of an electric pulse based on a result obtained by generating the image of the at least one imaging object; and
calibrating by mapping at least one photon energy which corresponds to an absorption edge of at least one calibration object.

12. The calibration method of claim 11, wherein the at least one imaging object comprises homogeneous materials, and a geometry of the at least one imaging object is set.

13. The calibration method of claim 11, wherein the at least one calibration object comprises a material which includes the absorption edge for which the at least one corresponding photon energy falls within a range of a measurable x-ray photon energy.

14. The calibration method of claim 11, wherein a ratio of a first quantity relating to an imaging result which relates to a case in which the at least one imaging object does not exist to a second quantity relating to an imaging result which relates to a case in which the at least one imaging object exists reflects a characteristic of the at least one imaging object.

15. The calibration method of claim 11, wherein a normalized intensity of an image representing the at least one imaging object reflects information relating to a geometry of the at least one imaging object.

16. The calibration method of claim 11, wherein the setting comprises setting a threshold which relates to a magnitude of an electric pulse which is generated in at least one pixel by an x-ray photon.

17. The calibration method of claim 16, wherein the setting comprises changing a normalized intensity value of a pixel among the at least one pixel, and matching the changed normalized intensity value to a normalized intensity value of another pixel.

18. The calibration method of claim 16, wherein the setting comprises setting the at least one pixel to have a same normalized intensity with respect to a threshold energy value that is set in advance.

19. The calibration method of claim 11, wherein the calibrating by mapping comprises calculating a ratio of a first quantity relating to an x-ray spectrum which is measured when the at least one imaging object does not exist to a second quantity relating to an x-ray spectrum which is measured when the at least one imaging object exists, and extracting a location in which an x-ray is significantly attenuated.

20. The calibration method of claim 19, wherein the absorption edge of the at least one calibration object comprises an absorption edge of a material which is used for forming the at least one calibration object in the extracted location in which the x-ray is significantly attenuated.

21. A non-transitory computer readable recording medium which stores a program which causes a computer to implement the method of claim 11.

22. A method for calibrating a photon counting X-ray detector, comprising:
generating an image of at least one imaging object;
setting a threshold which relates to a result of the generating the image of the at least one imaging object; and
using a first measured photon energy value which relates to the generated image and a second measured photon energy value which relates to at least one calibration object to determine a normalized photon intensity value with respect to the set threshold which relates to the at least one calibration object; and
calibrating the photon counting X-ray detector based on the determined normalized intensity value and the set threshold.

23. The method of claim 22, wherein the calibrating further comprises adjusting a normalized intensity profile which relates to the at least one calibration object such that the normalized intensity value which relates to the at least one calibration object with respect to the set threshold is approximately equal to a corresponding normalized intensity value which relates to the at least one imaging object with respect to the set threshold.

24. The method of claim 22, wherein the at least one calibration object comprises a first portion which includes an absorption material and at least a second portion which does not include the absorption material, and wherein the second measured photon energy value relates to the first portion of the at least one calibration object.

* * * * *